Nov. 11, 1958  G. W. WINTER  2,860,332

"C" SCAN FOR CATHODE RAY TUBES

Filed Sept. 30, 1954

INVENTOR
GEORGE W. WINTER

BY

ATTORNEYS

United States Patent Office 2,860,332
Patented Nov. 11, 1958

2,860,332

"C" SCAN FOR CATHODE RAY TUBES

George W. Winter, Glen Burnie, Md., assignor, by mesne assignments, to the United States of America as represented by the Secretary of the Navy Application September 30, 1954, Serial No. 459,567

3 Claims. (Cl. 343—11)

This invention relates to a radar system employing an improved C-scan type of presentation.

A C-scan type of presentation is one in which a voltage proportional to one of two independent variables is applied to one set of deflection plates of a cathode ray tube and a voltage proportional to the other independent variable is applied to the other set of deflection plates of the cathode ray tube. The face of the cathode ray tube is calibrated in units corresponding to each of the independent variables, one of said variables appearing as the ordinate and the other as the abscissa. Whenever the phenomenon under investigation satisfies each of the independent variables, an indication appears on the face of the cathode ray tube in the form of an intensified signal. This signal can be read from the face of the cathode ray tube in rectangular coordinates.

In radar applications, the C-scope is used to present the azimuth and elevation angles of a radar beam which is sweeping systematically through a given sector of space. At certain combinations of these two variables, targets are located and appear on the screen as intensity modulated echoes. However, in pulsed radar systems the time relationship between the scan rate and the pulse repetition rate presents a problem. This problem occurs because in the C-scan the time-base is compressed to a dot, and all information appearing along the time-base line is integrated to make up the total intensity of the dot. Therefore, if the phenomenon under observation produces a signal which occupies but a small time interval of the total base line, as is usually the case in pulsed systems, its signal contributes but a small incremental effect to the integrated intensity of the dot. As a practical matter this means that it would be very difficult to differentiate between a dot in which the signal occurs and one in which only noise occurs.

In the prior art radar systems employing a C-scope presentation, a common method for overcoming the above mentioned drawbacks was to employ an A-scope in conjunction with the C-scope. The A-scope type of presentation is one in which range only is obtained; that is, signals are obtained on the scope as a function of time, and this time is converted into range units by proper calibration on the face of the A-scope. A pedestal, supplied to the system providing the A-scope presentation, is moved along the time base line until the target echo is mounted thereon. The pedestal obtained in this manner is used to obtain the needed contrast in the C-scope presentation (which produces the required intelligence in terms of azimuth and elevation) in order to differentiate between a response on the C-scope containing a signal and a response without a signal. The cooperation between the A-scope and the C-scope is obtained by biasing the C-scope so that only during the short time interval represented by the width of the pedestal is the screen of the C-scope brightened regardless of the azimuth elevation position of the antenna. Thus the noise and signal are integrated only over the brief time corresponding to the time duration of the pedestal. This is a condition for the satisfactory operation of the C-scope in pulsed systems to distinguish target echoes from noise. However, it can readily be seen that the above type of operation of the C-scope has the disadvantage of restricting the space area which can be presented on the C-scope display; that is, this method provides a C-scope plot of azimuth and elevation over a relatively small interval of range since the size of this range interval must be kept small if weak signals are to be recognized in the midst of noise. It can also readily be seen that echoes which are obtained from the range outside of that represented by the pedestal will not appear on the C-scope.

The instant invention overcomes the above described drawbacks inherent in the prior art. This invention discloses a radar system employing a C-scope presentation in which the necessary contrast between a target signal and noise is obtained over the entire range of the radar system rather than over a limited range as described above. This contrast is obtained by generating a spiral waveform on the face of the C-scope about the representation on the C-scope corresponding to the true azimuth-elevation position of the antenna. This spiral starts at the time the radar transmitter pulse is fired and ends after a time duration which is equal to the range of the radar. The spiral intensity is adjusted so that with noise present and without targets present it is just at the threshold of visibility. Any target echoes which are obtained by the radar system will appear as visible intensified spots along the path of the spiral. With this system each target echo appears as a distinct spot, and all targets within the radar range are indicated on the cathode ray tube. Thus it can be seen that the C-scope presentation of the instant invention eliminates the necessity for an auxiliary display, such as an A-scope which is used primarily for the selection of the range of targets which are desired to be placed on the C-scope. It is further noted that in addition to the position of the spiral on the face of the cathode ray tube being an indication of the azimuth and elevation of a target that the relative position of the target echo spot on the spiral can be used to provide a measurement of the range to the target.

It is accordingly one object of the instant invention to provide a radar system employing a C-scope type of presentation which does not utilize an auxiliary radar scope for the purpose of aiding in the eliminating of undesirable background noise.

It is another object of this invention to provide a radar system which utilizes a C-scope type of presentation which is at all times operative over the entire range of the radar system.

It is a further object of this invention to provide a radar system employing a C-scope presentation which provides the necessary contrast between the target echoes and noise over the entire range of the system.

It is still a further object of this invention to provide a radar system having a C-scope type of presentation which not only gives the azimuth and elevation of a target but also gives a visual indication of the range of a target.

Other objects and many of the attendant advantages of this invention will be readily appreciated as the same becomes better understood by reference to the following detailed description when considered in connection with the accompanying drawings wherein.

Figure 1:
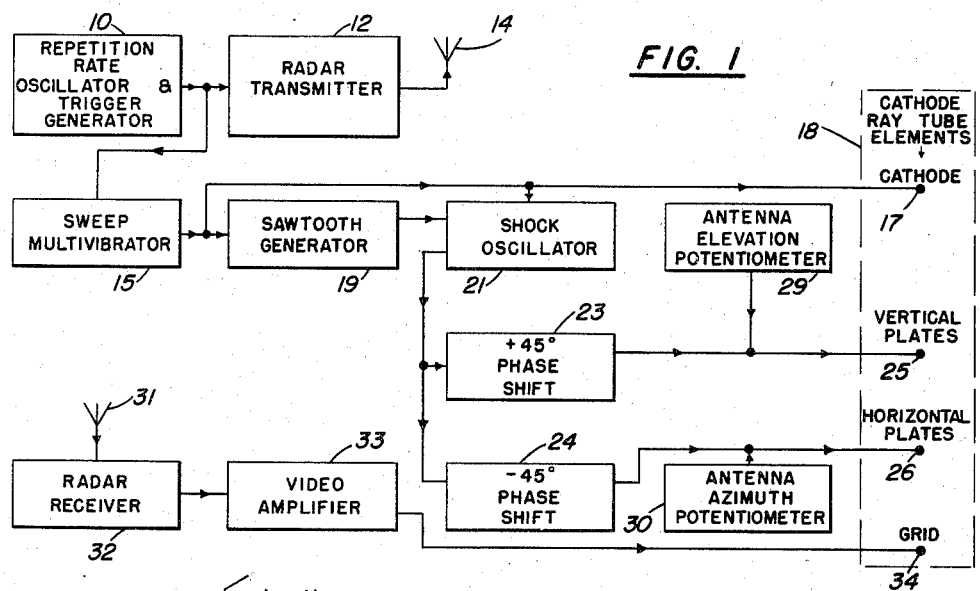
Fig. 1 is a block diagram of the radar system of this invention.
Figure 2:
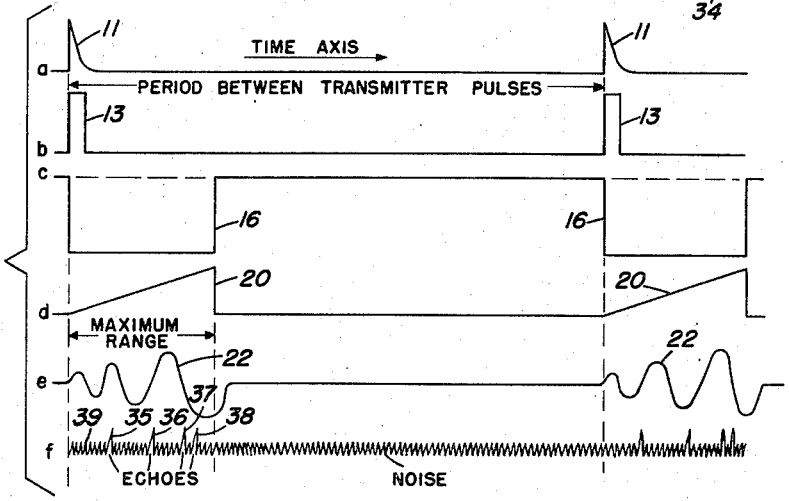
Fig. 2 is a graphical representation depicting the voltage waveforms at various points in the radar system of Fig. 1.

Reference is now made to Figs. 1 and 2 for a general description of the instant radar system. Numeral 10 represents a repetition rate oscillator and trigger generator which produces the positive pulses 11 shown in Fig. 2a. The oscillator-trigger generator 10 is coupled to radar transmitter 12 which produces the high-powered pulses 13, Fig. 2b, whenever it is energized by pulses 11. Antenna 14 is coupled to radar transmitter 12 for transmitting the pulses 13. The oscillator-trigger generator 10 is also coupled to a one-shot multivibrator 15 which produces the negative square waves 16 shown in Fig. 2c which are supplied to the cathode 17 of cathode ray tube 18. The square waves 16 have a time duration equal to the maximum range of the radar system. The square waves 16 are also supplied to sawtooth generator 19 which produces the sawtooth waves 20 shown in Fig. 2d. The outputs from multivibrator 15 and sawtooth generator 19 are coupled to shock ascillator 21, to produce the waveforms 22 shown in Fig. 2e. The waveforms 22 are coupled to phase shifting circuits 23 and 24. Phase shifting circuit 23 shifts waveform 22 a plus 45 degrees. Phase shifting circuit 24 shifts waveform 22 a minus 45 degrees. The outputs from phase shifting circuits 23 and 24 are superimposed on the direct voltages from the antenna elevation positioning potentiometer 29 and antenna azimuth potentiometer 30, respectively. The combined outputs from each phase shifting circuit and its respective potentiometer are applied to the vertical plates 25 and horizontal plates 26, of cathode ray tube 18 as shown in Fig. 1. It can thus be seen that there is a 90 degree phase shift in the signals which are supplied to the horizontal and vertical plates of the cathode ray tube. Since these waveforms are of a configuration shown in Fig. 2e and have a 90 degree phase relationship, a spiral waveform 27, Figs. 3 and 4, will be generated on the face 28 of cathode ray tube 18 for each pulse transmitted by the radar transmitter. The part of the spiral which would normally show up as a retrace is removed by the blanking signal applied to the cathode of the cathode ray tube.

Figure 4:
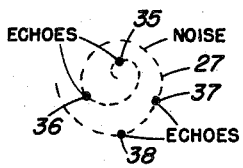
Fig. 4 is an enlargement of the spiral waveform shown in Fig. 3.

The target echoes and noise are received by antenna 31 of radar receiver 32, amplified by video amplifier 33, and are coupled to the grid 34 of cathode ray tube 18. The target echoes are depicted by numerals 35, 36, 37, and 38, Fig. 2f; and the noise is depicted by numeral 39, Fig. 2f. In Fig. 2f the signals are shown as a function of time. The target echo signals 35, 36, 37, and 38, being coupled to the grid 34 of cathode ray tube 18, cause an intensity modulation of the spiral 27 to give dots 35, 36, 37, and 38, as shown in Fig. 4. Thus it can be seen that each target appearing within a certain azimuth and elevation of the antenna appears as a distinct dot on the face of the cathode ray tube since the time base line of the receiver appears on the face of the cathode ray tube in the form of a spiral rather than as a dot as it did in previous systems.

Figure 3:
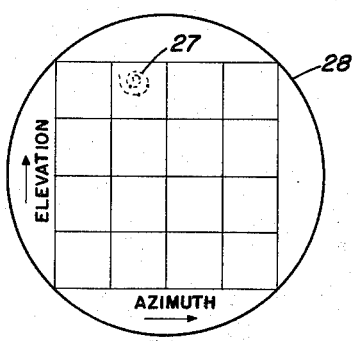
Fig. 3 is a view which shows a spiral waveform which appears on the face of the cathode ray tube of the radar system shown in Fig. 1.

The operation of the radar system is as follows: With no echoes present, the intensity of the cathode ray tube beam is adjusted until the noise is barely visible. Therefore, in actual operation of the system any echo which appears will show up as a clearly visible spot on the face of the cathode ray tube as described above. Furthermore, if several echoes are all within the beam of the antenna when it is at a particular azimuth and elevation angle, they show up as distinct completely separate targets as shown in Figs. 3 and 4. Since the targets show up as distinct dots on the spiral in a definite time relationship to their respective distances from the radar set when the antenna is at a given azimuth and elevation, the relative positions of the targets on the spiral can be used as a measure of range of the individual targets.

Thus it can be seen that the instant radar system requires no auxiliary presentation for the purpose of eliminating background noise; that the C-scope presentation of this system at all times eliminates noise over the entire range of the system; and the C-scope presentation not only gives the azimuth and elevation of a target but also gives a visual indication of the range of the target. The number of revolutions of the spiral is as large as possible, the spot size of the cathode ray tube beam being the limiting factor. The maximum diameter of the spiral is determined by a number of other factors such as the actual physical size of the cathode ray tube, the beam width of the antenna, and the permissible deviation from the true azimuth-elevation position.

Obviously many modifications and variations of the present invention are possible in the light of the above teachings. It is therefore to be understood that within the scope of the appended claims the invention may be practiced otherwise than as specifically described.

Having thus described my invention I claim:

1. A radar system having a C-scan presentation which is operative over the entire range of the radar system comprising a radar transmitter, a trigger generator coupled to said transmitter for producing trigger pulses which energize said transmitter, a radar receiver, a cathode ray tube operatively associated with said receiver, horizontal and vertical deflection plates operatively associated with said cathode ray tube, means coupled to said horizontal deflection plates for applying an oscillating voltage thereto having a gradually increasing amplitude, means coupled to said vertical deflection plates for applying an oscillating voltage thereto having the same waveform as applied to said horizontal deflection plates but out of phase therewith, said voltages being applied to said plates in timed relationship to the occurrence of said trigger pulses whereby a substantially spiral waveform is produced on said face of said cathode ray tube, and means coupled to said cathode ray tube for intensity modulating portions of said spiral waveform when target echoes are received by said radar receiver.

2. A radar system employing a cathode ray tube presentation which produces a dot on the face of a cathode ray tube when a condition dependent on the three independent variables of azimuth, elevation, and range of a target is satisfied, comprising a radar transmitter, a trigger generator coupled to said radar transmitter for causing said transmitter to produce pulses, a radar receiver, said cathode ray tube being operatively coupled to said radar receiver, first and second sets of deflection plates operatively associated with said cathode ray tube, first means coupled to said trigger generator for producing an oscillating voltage waveform of varying magnitude which starts when said pulse is transmitted by said transmitter and which has a duration equivalent to the range of the radar system, means for coupling said oscillating voltage waveform to said first set of deflection plates, means for phase shifting said oscillating voltage waveform, second means coupled to said phase shifting means for coupling said shifted voltage waveform to said second set of deflection plates whereby a substantially spiral pattern is generated on said cathode ray tube, said spiral pattern having a time duration which is equivalent to the range of the radar system, said radar receiver being operatively associated with said cathode ray tube for intensity modulating portions of said spiral pattern when target echoes are received by said radar receiver, the position of said spiral pattern on said cathode ray tube being an indication of the azimuth and elevation of said target and the position of the intensity modulation on said spiral being an indication of the range of said target.

3. A radar system which is operative throughout its entire range to differentiate target echoes from undesired signals while producing a C-scope presentation which provides a dot on the face of a cathode ray tube which indicates the azimuth and elevation of a target comprising a radar transmitter for transmitting radar pulses, a radar receiver, a cathode ray tube having a plurality of sets of beam deflection plates operatively associated with said receiver, first means coupled to said transmitter for initiating an oscillating voltage waveform of varying magnitude at the start of each radar pulse, means for applying said voltage waveform to one of said sets of beam deflection plates, second means coupled to said first means for producing a second voltage waveform which is of the same shape but out of phase with the oscillating voltage waveform produced by said first means, means coupled to said second means for applying said second voltage to another set of deflection plates whereby a substantially spiral pattern is generated on said cathode ray tube, said oscillating voltages and said spiral pattern having a time duration which is equivalent to the range of the radar system, and means coupling said radar receiver and said cathode ray tube for intensity modulating portions of said spiral pattern when a target echo is received by said receiver, said intensity modulations being indications of the azimuth and elevation of a target and said spiral being composed of undesired signals.

References Cited in the file of this patent

UNITED STATES PATENTS

| | | |
|---|---|---|
| 2,408,415 | Donaldson | Oct. 1, 1946 |
| 2,416,591 | Muntz | Feb. 25, 1947 |
| 2,427,905 | Fyler | Sept. 23, 1947 |
| 2,530,060 | Holdam, Jr. et al. | Nov. 14, 1950 |
| 2,610,320 | Hall | Sept. 9, 1952 |
| 2,617,982 | Holschuh et al. | Nov. 11, 1952 |
| 2,648,061 | Parker et al. | Aug. 4, 1953 |